Nov. 3, 1942.    L. G. STOPPS    2,300,991
ELECTRICAL APPARATUS
Filed Feb. 26, 1941    2 Sheets-Sheet 1
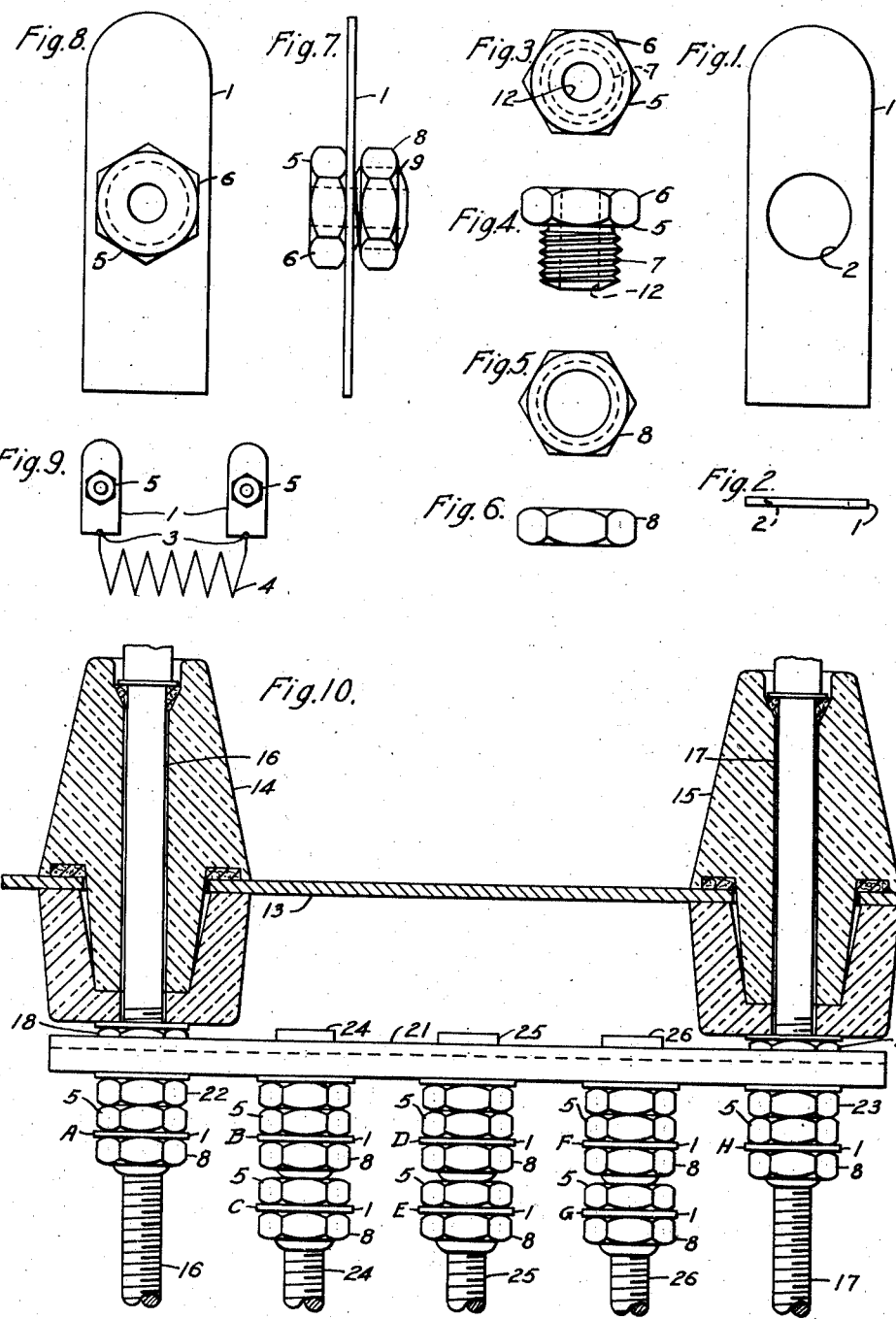
WITNESSES:
INVENTOR
Leonard G. Stopps
BY
Franklin E. Hardy
ATTORNEY Nov. 3, 1942.                L. G. STOPPS                2,300,991
                         ELECTRICAL APPARATUS
                         Filed Feb. 26, 1941           2 Sheets-Sheet 2
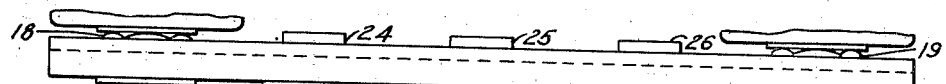
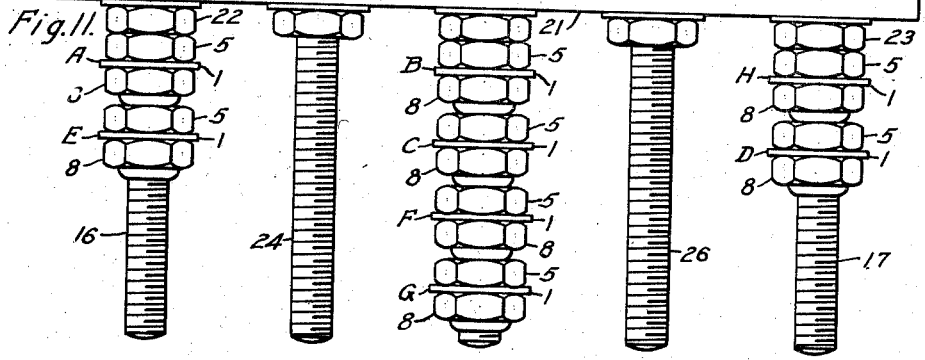
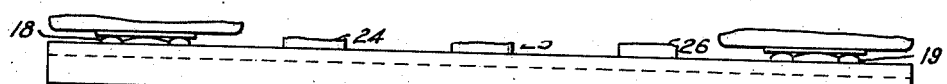
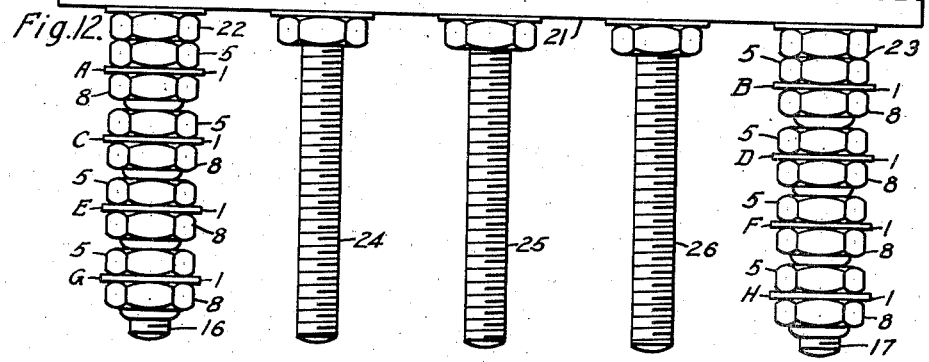
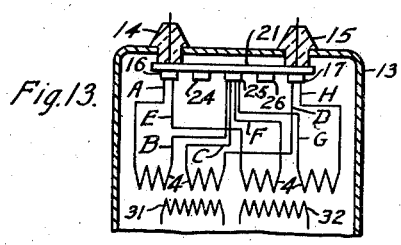
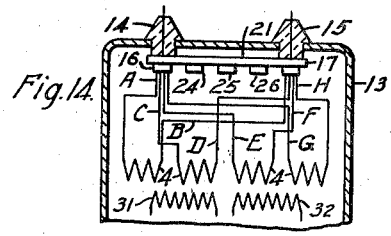
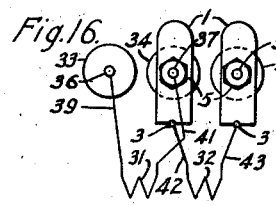
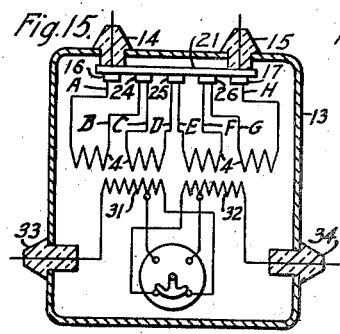
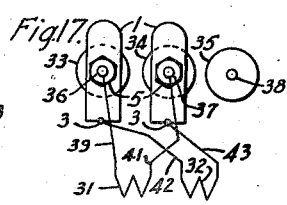
WITNESSES:
INVENTOR
Leonard G. Stopps.
BY
ATTORNEY Patented Nov. 3, 1942

2,300,991

UNITED STATES PATENT OFFICE 2,300,991

ELECTRICAL APPARATUS

Leonard G. Stopps, Hamilton, Ontario, Canada, assignor to Westinghouse Electric & Manufacturing Company, East Pittsburgh, Pa., a corporation of Pennsylvania Application February 26, 1941, Serial No. 380,664

6 Claims. (Cl. 173—324)

My invention relates to electrical apparatus, and more particularly to connectors for changing circuit connection in such apparatus.

It is an object of the invention to provide a connector that is adapted for readily changing the connections of electrical apparatus, such as transformers, in which there are no loose parts that may drop into the apparatus casing.

Other objects and advantages of the invention will be apparent from the following description of a preferred embodiment thereof, reference being had to the accompanying drawings, in which:

Figs. 1 to 9 are detail views of various parts of the equipment to be later explained;

Figs. 10, 11 and 12 are plan views, partly in section, showing electrical apparatus bushings and a terminal board employing the connectors of the invention arranged for effecting different circuit connections;

Figs. 13, 14 and 15 are diagrammatic views showing the circuit arrangements of transformer windings when the leads therefrom are arranged in accordance with the arrangement of the terminal connectors shown in Figs. 11, 12 and 10, respectively; and Figs. 16 and 17 are diagrammatic views showing circuit arrangements of a transformer employing two secondary windings and three terminal bushings.

The connector consists of a flat or sheet-like terminal member 1, a side view of which is shown in Fig. 1 and an end view in Fig. 2, having an opening 2 therein, which terminal members may be connected by welding to the ends of the leads or wires leading from the electrical apparatus, as, for example, illustrated in Fig. 9, in which the terminal members 1 are welded at 3 to the ends of the conductors leading from a transformer winding 4. In order to provide for connecting the terminal members 1 to any one of a plurality of bushing studs or circuit connecting studs from which they may be readily disconnected and reconnected to other studs in order to rearrange the connections of the electrical apparatus, a special nut 5 is provided having a flanged hexagonal head portion 6 and an externally threaded sleeve portion 7. The externally threaded sleeve portion 7 extends through the opening 2 in the terminal member 1 and receives an internally threaded nut 8 shown in assembled position in Figs. 7 and 8. The outer threaded end of the sleeve 7 is spun over at 9 to prevent the nut 8 from being removed from the sleeve of the nut 5. The nut 8 is permitted sufficient backing-off movement from engagement with the terminal member 1 to release any friction between the nuts 5 and 8 and the member 1, so as to permit the nuts 5 and 8 to be freely rotated, the nut 5 rotating within the opening 2, and the nut 8 being prevented from coming off the nut 5 so that the three elements 1, 5 and 8 form a unitary connector assembly. The nut 5 is shown in end and side views in Figs. 3 and 4, and the nut 8 is shown in end and side views in Figs. 5 and 6. A screw-threaded bore 12 is provided extending axially through the sleeve nut 5 to permit ready attachment of the sleeve nut to the several studs shown in Figs. 10, 11 and 12.

Referring to Fig. 10, a transformer casing wall 13 is shown on which are mounted terminal bushings 14 and 15, through which extend bushing studs 16 and 17 upon which nuts 18 and 19 are positioned for holding the bushing assemblies in position on the casing wall. A terminal board 21 is mounted on the bushing studs 16 and 17 and attached thereto by nuts 22 and 23. The screw-threaded end portions of the bushing studs 16 and 17 extend inwardly from the terminal board 21, as do also screw-threaded portions of additional studs 24, 25 and 26 that are mounted on the terminal board 21. The several connector assemblies A, B, C, D, E, F, G and H shown on the several studs in Fig. 10, each consisting of a sleeve nut 5, a terminal member 1 and a nut 8 as shown in Fig. 7, are arranged to complete circuit connections, as illustrated in Fig. 15, in which the several secondary windings 4 are all connected in series between the terminal bushing studs 16 and 17, so that if each winding has a secondary voltage of 110 volts, the voltage between the terminal studs 16 and 17 will be 440 volts. It will be noted that the winding having terminals A and B is connected between studs 16 and 24, the winding having terminals C and D is connected between studs 24 and 25, the winding having terminals E and F is connected between studs 25 and 26, and the winding having terminals G and H is connected between studs 26 and 17 thereby serially connecting the windings between the bushing studs 16 and 17. In the diagrammatic view of Fig. 15, primary windings 31 and 32 are illustrated which are magnetically coupled to the several secondary windings 4 in a well-known manner, and are connected through high-voltage bushings 33 and 34 to a primary circuit.

If it is desired to rearrange the terminal connections of the several secondary windings 4 to obtain 220 volts on the secondary circuit of the transformer, the terminal assemblies of the several windings are rearranged, as shown in Figs. 11 and 13, the terminal assemblies A and E being attached to the terminal studs 16, the terminal assemblies B, C, F and G being attached to the stud 25, and the terminal assemblies H and D being attached to the terminal stud 17. Thus, the first and third of the four windings from either of the groups, as viewed in Fig. 13, are connected in parallel with each other between studs 16 and 25, and in series with the other two windings which are connected in parallel with each other between studs 25 and 17.

Likewise, if it is desired to obtain a secondary voltage of 110 volts, all four of the windings may be connected in parallel by rearranging the winding terminal assemblies, as shown in Figs. 12 and 14, in which the terminal connector assemblies A, C, E and G are attached to the terminal stud 16, and the terminal connector assemblies B, D, F and G are all attached to the terminal studs 17 connecting all of the secondary windings in parallel between the two terminal studs.

It will be appreciated from the above description of the invention that, in order to rearrange the terminal connector assemblies, it is only necessary to loosen the nut 8 on the assembly so as to relieve the friction engagement between the nuts 5 and 8 and the terminal member 1, thus permitting the two nuts 5 and 8 to turn jointly upon the screw threaded stud passing through the bore in the sleeve nut 5 to disconnect the assembly from the stud and to attach the assembly in like manner to another selected stud to make the desired connection, after which the nut 8 may be tightened against the terminal member 1 to insure good electrical contact therewith.

It will be appreciated that the several parts of the assembly remain at all times attached to their associated terminal leads, so that at no time in making a change in the winding connections are there any loose parts that may be lost or dropped into the casing to damage the electrical apparatus, as may readily be done if conducting parts are dropped and remain adjacent the windings of electrical coils.

In Figs. 16 and 17 two secondary windings 31 and 32 are shown which are within a transformer casing (not shown) and may be connected to the outside circuit through bushings 33, 34 and 35 having bushing studs 36, 37 and 38, respectively. In Figs. 16 and 17 the winding 31 is permanently connected by terminal leads 39 and 41 to bushing studs 36 and 37 and the winding 32 is connected by terminal leads 42 and 43 to terminal assemblies similar to those shown in Fig. 7. In Fig. 16 these terminal assemblies are attached to bushing studs 37 and 38, and in Fig. 17 to bushing studs 36 and 37, respectively. In Fig. 17, therefore, the two windings 31 and 32 are connected in parallel circuit relation between the bushing studs 36 and 37 and in Fig. 16 these windings are connected in series between studs 36 and 38 with the stud 37 connected to their adjoining ends.

It will be apparent to those skilled in the art that modifications in the apparatus illustrated and described may be made within the spirit of my invention, and I do not wish to be limited otherwise than by the scope of the appended claims.

I claim as my invention:

1. In a connector for electrical apparatus, a unitary terminal assembly comprising non-separable parts including a flat terminal member permanently attached to a terminal lead of the apparatus and provided with an opening therein, a sleeve having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, the end of said sleeve being spun over to prevent removal of said nut from said sleeve and having a bore axially therethrough for attaching the terminal member to a circuit conducting member.

2. In a connector for electrical apparatus, a unitary terminal assembly comprising non-separable parts including a flat terminal member permanently attached to a terminal lead of the apparatus and provided with an opening therein, a sleeve having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, said sleeve having a threaded bore therethrough for attachment to a threaded stud and being spun over at its outer end to prevent removal of the nut from the sleeve while permitting the nut to be loosened on the sleeve for rotating the sleeve on the threaded stud.

3. In an electrical apparatus, means for varying circuit connections of said apparatus comprising a plurality of connecting studs mounted on a terminal board and a plurality of conducting leads connected to the apparatus and each provided with a lead terminal assembly comprising a flat terminal member permanently attached to a terminal lead of the apparatus and provided with an opening therein, a sleeve having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, the end of said sleeve being spun over to prevent removal of said nut from said sleeve and having a bore axially therethrough for attaching the terminal member to a circuit conducting member.

4. In an electrical apparatus, means for varying circuit connections of said apparatus comprising a plurality of screw threaded connecting studs mounted on a terminal board and a plurality of conducting leads connected to the apparatus and each provided with a lead terminal assembly comprising a flat terminal member permanently attached to a terminal lead of the apparatus and provided with an opening therein, a sleeve having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, said sleeve having a threaded bore therethrough for attachment to a threaded stud and being spun over at its outer end to prevent removal of the nut from the sleeve while permitting the nut to be loosened on the sleeve for rotating the sleeve on the threaded stud.

5. In an electrical apparatus comprising a plurality of parts, means for varying the circuit connections of said parts comprising a plurality of bushing studs and a plurality of conducting leads connected to each of the apparatus parts and each lead from at least one of the parts being provided with a lead terminal assembly comprising a flat terminal member permanently attached to a terminal lead of the apparatus and provided with an opening therein, a sleeve nut having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, the end of said sleeve being spun over to prevent removal of said nut from said sleeve and having a bore axially therethrough for attaching the terminal member to a circuit conducting member.

6. In an electrical apparatus, means for varying circuit connections of said apparatus comprising a plurality of threaded bushing studs and a plurality of conducting leads connected to the apparatus and certain of said leads being provided with a lead terminal assembly comprising a flat terminal member permanently attached to a terminal lead of the apparatus and provided with an opening therein, a sleeve nut having an externally threaded portion extending through the opening in said terminal member and a flanged head for engaging one side of said terminal member, and an internally threaded nut on the externally threaded portion of the sleeve on the other side of the terminal member from the flanged head for tightly holding said terminal member against said flanged head, said sleeve having a threaded bore therethrough for attachment to a threaded stud and being spun over at its outer end to prevent removal of the nut from the sleeve while permitting the nut to be loosened on the sleeve for rotating the sleeve on the threaded stud.

LEONARD G. STOPPS.